United States Patent
Sugiura et al.

(10) Patent No.: US 7,141,166 B2
(45) Date of Patent: Nov. 28, 2006

(54) DRAIN STRUCTURE HAVING DRAINPIPE AND FLUID FILTER USING THE SAME

(75) Inventors: Yoshihiko Sugiura, Kariya (JP); Toshihiro Takahara, Kariya (JP); Noriyuki Tsuge, Okazaki (JP)

(73) Assignees: Toyoda Boshoku Corporation (JP); Denso Corporation (JP)

( * ) Notice: Subject to any disclaimer, the term of this patent is extended or adjusted under 35 U.S.C. 154(b) by 0 days.

(21) Appl. No.: 10/957,615

(22) Filed: Oct. 5, 2004

(65) Prior Publication Data

US 2005/0077253 A1 Apr. 14, 2005

(30) Foreign Application Priority Data

Oct. 10, 2003 (JP) ............................. 2003-352711
Oct. 10, 2003 (JP) ............................. 2003-352712

(51) Int. Cl.
- B01D 35/16 (2006.01)
- B01D 27/08 (2006.01)
- B01D 35/137 (2006.01)
- F01M 11/04 (2006.01)
- F16L 37/40 (2006.01)

(52) U.S. Cl. ................ 210/234; 210/248; 210/440; 251/149.1; 251/149.6; 251/149.9; 184/1.5

(58) Field of Classification Search ............... 210/234, 210/248, 440; 251/149.6, 149.9, 149.1; 184/1.5
See application file for complete search history.

(56) References Cited

U.S. PATENT DOCUMENTS 4,951,723 A * 8/1990 Hoeptner, III ............... 141/351
5,366,400 A * 11/1994 Kucik ....................... 440/88 L
5,431,588 A * 7/1995 Kucik ....................... 440/88 L
6,092,570 A * 7/2000 Densel et al. ............... 141/353

FOREIGN PATENT DOCUMENTS

DE 19960203 6/2001
EP 1 419 808 A1 5/2004

(Continued)

OTHER PUBLICATIONS

European Search Report.

(Continued)

*Primary Examiner*—Thomas M. Lithgow
(74) *Attorney, Agent, or Firm*—Nixon & Vanderhye PC (57) ABSTRACT

An oil filter has a drain hole, which is internally blocked with a valve member. When oil remaining in the oil filter is drained, a drainpipe is inserted into the drain hole, so that the valve member is displaced and remaining oil is drained from the drain hole. This valve member has an annular recession to steadily support an upper end of the inserted drainpipe. Therefore, gripping force of the drainpipe is enhanced without decreasing draining performance. The drainpipe and the oil filter are connected with each other via a seal member that is provided to the oil filter. The drainpipe 80 has a removing means that holds at least a part of the seal member to pick the seal member off the oil filter, when the inserted drainpipe is detached from the drain hole. Thus, the seal member can be removed simultaneously with the drainpipe from the oil filter.

19 Claims, 6 Drawing Sheets

U.S. PATENT DOCUMENTS

| | | | |
|---|---|---|---|
| 6,234,274 B1 * | 5/2001 | van der Griendt | 184/105.3 |
| 6,644,624 B1 * | 11/2003 | Jainek | 251/149.6 |
| 6,655,498 B1 * | 12/2003 | Sasa et al. | 184/1.5 |
| 2002/0104980 A1 | 8/2002 | Jainek | |
| 2004/0144734 A1 | 7/2004 | Suzumori et al. | |

FOREIGN PATENT DOCUMENTS

| | | |
|---|---|---|
| JP | U-58-26911 | 2/1983 |
| JP | A-11-104408 | 4/1999 |
| JP | 2001098919 A * | 4/2001 |
| WO | 01/07819 * | 2/2001 |

OTHER PUBLICATIONS

Chinese Office Action dated May 19, 2006, issued in Chinese Patent Application No. 2004100835943.

European Examination Report dated Mar. 30, 2006, issued in European Patent Application No. 04023962.6.

* cited by examiner

DRAIN STRUCTURE HAVING DRAINPIPE AND FLUID FILTER USING THE SAME

CROSS REFERENCE TO RELATED APPLICATIONS

This application is based on and incorporates herein by reference Japanese Patent Applications No. 2003-352711 filed on Oct. 10, 2003 and No. 2003-352712 filed on Oct. 10, 2003.

FIELD OF THE INVENTION

The present invention relates to a fluid filter having a drain structure and a drainpipe for draining fluid remaining in the fluid filter.

BACKGROUND OF THE INVENTION

In general, lubricant oil, which is received in an oil filter for an internal combustion engine or a machining tool, becomes hot. Accordingly, a worker, who drains oil remaining in an oil filter, have to be restricted from getting burned and getting dirt with drained oil in a draining work when a filter element is replaced.

According to JP-A-11-104408, a pipe member 14 is provided in a filter body of a fluid filter, and a cylindrical drain plug 15$f$ is screwed into the pipe member 14. The drain plug 15$f$ axially extends to the outside of the filter body. The drain plug 15$f$ has a window hole 15$f$. When the drain plug 15$f$ is screwed into the pipe member 14, the window hole 15$f$ is blocked with the sidewall of the pipe member 14. When the drain plug 15$f$ is loosened, the window hole 15$f$ is positioned on the lower side of the sidewall of the pipe member 14, so that the window hole 15$f$ communicates with a gap formed between the pipe member 14 and the filter body. Thus, fluid remaining in the fluid filter flows into the window hole 15$f$ of the drain plug 15$f$ through the gap, so that the fluid is drained to the outside of the filter body through the drain plug 15. Fluid remaining in the filter body can be drained to a predetermined place using this drain structure. Therefore, drained oil can be restricted from dripping to a worker, so that the worker can be restricted from getting burned and getting dirt.

However, in this fluid filter, the window hole 15$f$ of the drain plug 15$f$ is received in the pipe member 14. Accordingly, the window hole 15$f$, i.e., drain port cannot be largely formed. When the window hole 15$f$ is small, remaining fluid cannot be quickly drained. As a result, draining work and replacement of the filter element takes long. Generally, a vehicular engine oil filter is replaced by a professional worker in a service station. While the filter element is replaced, a vehicle owner has to wait, accordingly, a draining time needs to be shortened. Here, the drain port of remaining fluid, i.e., window hole 15$f$ may be enlarged, however in this structure, the fluid filter may be jumboized.

According to JP-A-2004-160348, a drain structure, in which a drainpipe is detachable from a drain hole formed in a cap of a fluid filter, is disclosed. In this drain structure, when the drainpipe is inserted, a valve member blocking the drain hole can be unblocked, so that the drain hole can be communicated with a drain passage formed in the sidewall of the inserted drainpipe. Most of the sidewall of the inserted drainpipe is used as a drain port, so that the drain port can be enlarged without jumboizing the drainpipe, and draining work can be efficiently performed. However, in this fluid filter, gripping force supporting the drainpipe is small, because the sidewall of the drainpipe is used as the drain port. Besides, a supporting member cannot be provided to the sidewall, because an additional supporting member may reduce efficiency of draining. When gripping force is small, the drainpipe may be detached or the drainpipe may be inclined in draining work.

Besides, the fluid filter needs to be entirely or partially replaced in accordance with pollution of the filter element and deterioration of a seal member. Normally, the seal member, which restricts fluid from leaking to the outside, is replaced simultaneously with the filter element.

In replaceable type filters according to JP-A-11-104408 and JP-A-2004-160348, fluid remaining in the fluid filter can be drained using a pipe member before replaceable components such as a filter element and a seal member are replaced.

In a quickly replaceable throwaway type oil filter according to JP-U-58-26911, a fluid filter is entirely replaced as appropriate. This oil filter is provided to a filter mounting portion 9 of an internal combustion engine. A gasket 3 is provided between the oil filter and the filter mounting portion 9. The gasket 3 prevents oil in the oil filter from leaking. The gasket 3 is supported by a gasket holding plate 2, which can receive the gasket that includes an edge portion and a string portion in the lower inner peripheral portion of the gasket. The gasket is supported by the gasket holding plate 2 having a special shape, so that the gasket 3 is not dropped from the oil filter when the oil filter is removed from the filter mounting portion 9. Therefore, the gasket can be quickly removed simultaneously with removing the oil filter, so that draining process can be reduced. However, this special shaped gasket holding plate 2 is applicable to a throwaway type fluid filter, and is difficult to apply to a replaceable type filter. In the fluid filters disclosed in JP-A-11-104408 and JP-A-2004-160348, a seal member 15$g$ needs to be replaced in addition to a replacing work of the filter element. Accordingly, total replacing work takes long, and replacing work becomes complicated.

SUMMARY OF THE INVENTION

In view of the foregoing problems, it is an object of the present invention to produce a drain structure and a drainpipe unit for a fluid filter, in which gripping force of the drainpipe is enhanced without decreasing draining performance. It is another object of the present invention to produce a drain structure and a drainpipe unit for a replaceable type fluid filter, in which a filter element and a seal member can be quickly and easily replaced.

According to the present invention, a drain structure of a fluid filter includes a main body, a cap, a drainpipe, a valve member, a cap side seal and a pipe side seal. The cap is detachable from the main body. The cap defines a drain hole that communicates with an inside of the main body. The drainpipe is detachable from the drain hole, and the drainpipe is able to be inserted into the drain hole. The valve member blocks the drain hole at least when the drainpipe is detached from the drain hole. The cap side seal is provided to the cap. The pipe side seal is provided to the drainpipe to seal with the cap side seal against the outside. The drainpipe is inserted into the drain hole, so that the upper end of the drainpipe contacts the valve member to displace the valve member in a direction in which the drain hole is unblocked. Fluid inside of the main body flows into the drainpipe through a drain passage defined in a portion of the drainpipe between the pipe side seal and the upper end of the drainpipe by insertion of the drainpipe. The valve member has a holding wall to support the upper end of the drainpipe that is inserted into the drain hole. A fluid filter has a drainpipe unit including the drain structure and a substantially annular seal member that is provided to the cap to seal between the cap and the drainpipe. The drainpipe has a removing means. The seal member is at least partially held by the removing means to be removed from the cap when the drainpipe is detached from the drain hole.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS (First Embodiment)

In the following embodiments, a vehicular oil filter for filtering and cleaning engine oil is shown as an example. Obviously, the fluid filter can be used for other purposes by modifying its size and components.

As shown FIGS. 1 to 4, an oil filter 10 is provided to a predetermined portion of an engine block in order to filter and clean lubricant oil of an internal combustion engine. Polluted oil, i.e., filtered object is introduced from an inlet port 18 formed in an upper end of a main body 12 of the oil filter 10, and filtered by a filter element 14 to be clean oil. The filtered oil returns to the engine through an outlet port 20 of the main body 12.

A cap 40 is detachably provided to a lower portion of the main body 12. The filter element 14 is replaced after the cap 40 is removed. A drain hole 50 is formed in the cap 40 to drain oil remaining in the oil filter 10 before the filter element 14 is replaced. The drain hole 50 is blocked with a valve member 70 and a drain bolt 60 in a normal condition, in which oil in the oil filter 10 is not drained.

Figure 3:
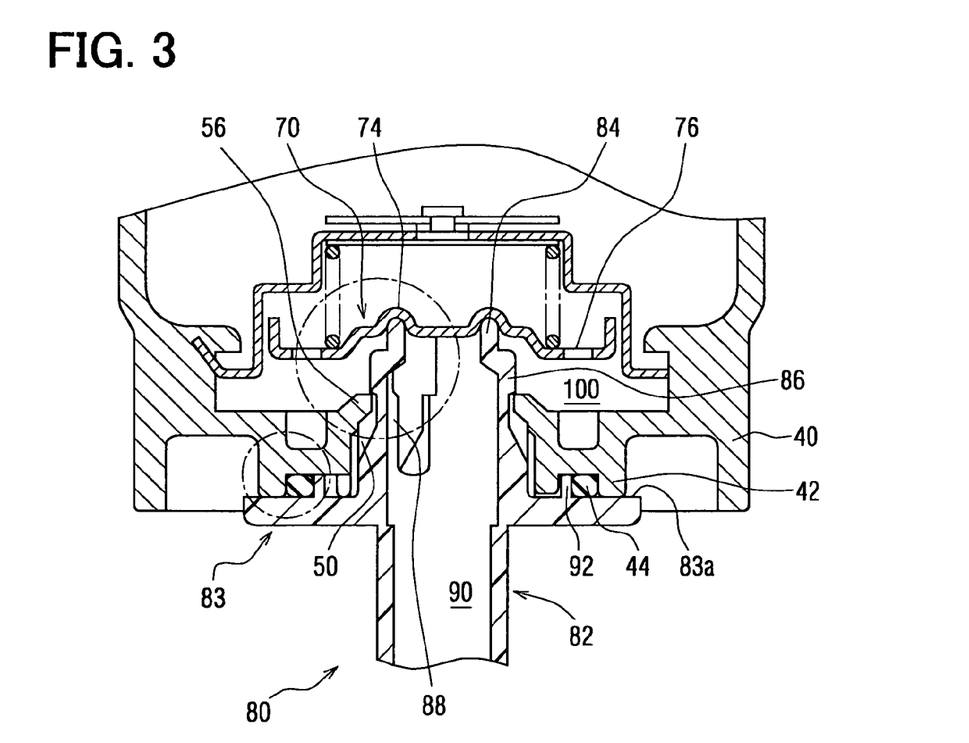
FIG. 3 is a cross-sectional side view showing a drainpipe inserted into the cap of the oil filter according to the first embodiment.

As shown in FIG. 3, the drain bolt 60 is removed from the cap 40 when the remaining oil is drained, and a drainpipe 80 is inserted into the drain hole 50 instead of the drain bolt 60, so that the remaining oil can be drained to the outside of the oil filter 10 through the drainpipe 80.

Figure 1:
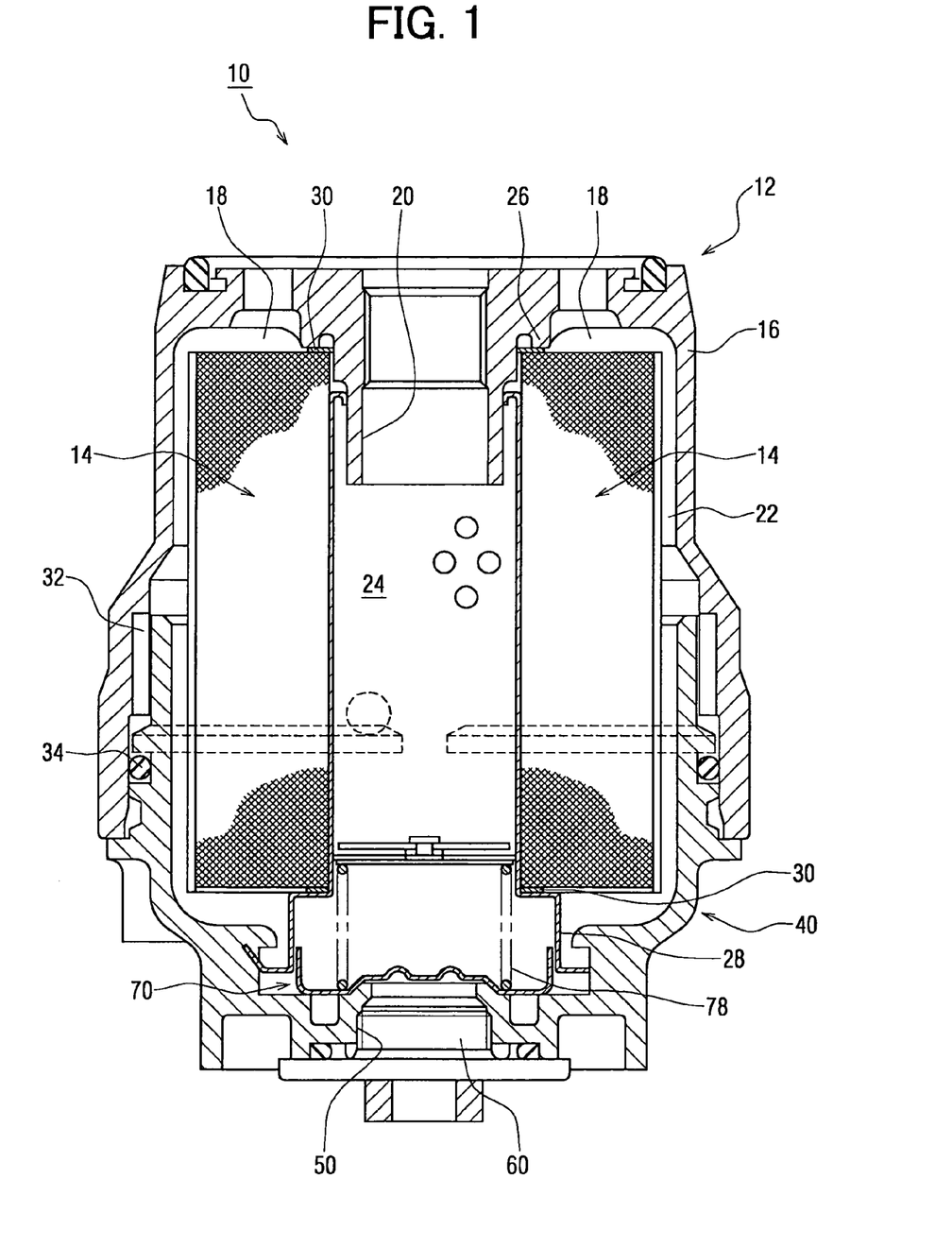
FIG. 1 is a cross-sectional side view showing an oil filter according to a first embodiment of the present invention.
Figure 2:
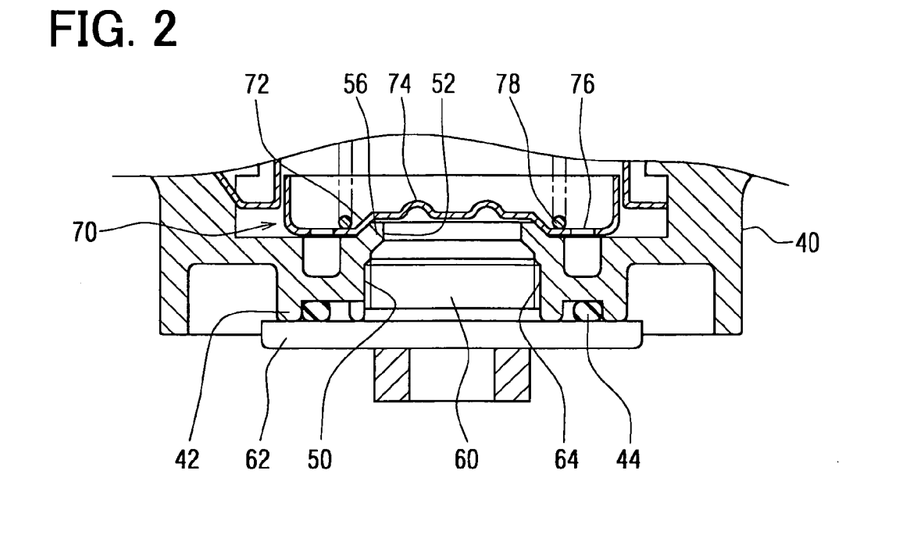
FIG. 2 is a cross-sectional side view showing a drain bolt screwed into a cap of the oil filter according to the first embodiment.

The main body 12 is constructed with a case 16 and the filter element 14. The case 16 and the cap 40 form an internal space in the main body 12, and the filter element 14 is arranged in the inner space of the main body 12.

The case 16 has a screwed portion 32 on its inside wall. The screwed portion 32 has a male thread. The case 16 and the cap 40 are screwed with each other, so that the inner space, in which the filter element 14 and the like are included, is formed in the main body 12. An O-ring 34 is arranged on the lower side of the screwed portion 32, so that the O-ring 34 seals between the cap 40 and the case 16.

The inlet port 18 and an outlet port 20 are formed on the upper side of the case 16. Polluted oil flows into the inlet port 18, and oil cleaned by the filter element 14 flows from the outlet port 20. The inner space of the main body 12 is divided into a polluted space 22 and a cleaned space 24 with the filter element 14 that filters the polluted oil. The inlet port 18 formed in the polluted space 22 and the outlet port 20 formed in the cleaned space 24 are communicated with each other through the filter element 14.

The filter element 14 is supported by a support protrusion 26 provided in an upper end portion of the case 16, and the filter element 14 is supported by a support member 28 provided in a lower end portion of the cap 40. A gap, i.e., the polluted space 22 is formed between the filter element 14 and the inner wall of the case 16. The cleaned space 24 is formed on the downstream side of the filter element 14 in the main body 12, and filtered oil flows into the cleaned space 24.

A seal member 30 is provided between the support protrusion 26 of the case 16 and the filter element 14. Another seal member 30 is provided between the support member 28 of the cap 40 and the filter element 14. The seal members 30 restrict polluted oil in the polluted space 22 from flowing into the cleaned space 24. The support member 28 is urged from its lower side by a resilient member 78, such as a spring provided in the cap 40 in a direction, in which the drain hole is blocked and sealed, so that polluted oil is restricted from flowing into the cleaned space 24.

Therefore, the polluted space 22 and the cleaned space 24 are completely separated, so that polluted oil cannot flow into the cleaned space 24 before the polluted oil becomes cleaned oil after passing through the filter element 14, in the oil filter 10.

Polluted oil flows into the inlet port 18, passes through the filter element 14 to be cleaned oil, and flows into the cleaned space 24 in the oil filter 10. The cleaned oil flows into the outlet port 20 of the case 16 from the cleaned space 24. Thus, polluted oil becomes cleaned oil and returns to the engine.

The cap 40 can be screwed to the case 16, and the cap 40 forms the inner space with the case 16. A drain hole 50 is formed on a lower side of a central portion of the cap 40. Oil remaining in the oil filter 10 is drained when the filter element 14 is replaced for example. A female thread is formed in the inner circumferential periphery of the drain hole 50, so that the drain bolt 60 can be screwed into the drain hole 50. A protrusion 56 is formed on the upper end of the drain hole 50 to block a gap between the protrusion 56 and the valve member 70. The protrusion 56 catches the drainpipe 80. The protrusion 56 radially internally protrudes, so that a small diameter portion 52 is formed in the drain hole 50 to be a partially diametrically small portion.

A cap side rib 42 (cap side seal) is formed to be an annular rib, i.e., circumferential wall on the bottom side of the cap 40. An O-ring 44, which is an elastic seal member, is provided to an inner circumferential sidewall of the cap side rib 42. The outer diameter of the O-ring 44 is slightly larger than the inner diameter of the cap side rib 42. Therefore, elastic restoring force of the O-ring 44 works radially outwardly against the cap side rib 42. The O-ring 44 is maintained radially inside of the cap side rib 42 by the elastic restoring force of the O-ring 44, so that the O-ring 44 does not easily drop from the cap side rib 42.

Referring back to FIGS. 1 and 2, the drain hole 50 is normally blocked with the valve member 70 and the drain bolt 60. The valve member 70 is a disc-shaped plate provided in the inner space of the oil filter 10. The valve member 70 is normally urged by the resilient member 78 in a direction, in which the drain hole 50 is blocked.

As shown in FIG. 3, when the drainpipe 80 is inserted into the drain hole 50, the valve member 70 contacts the upper tip end of the drainpipe 80. When the drainpipe 80 is inserted against resilience of the resilient member 78, the valve member 70 is displaced to the upper direction, in which the drain hole 50 is unblocked.

Figure 4:
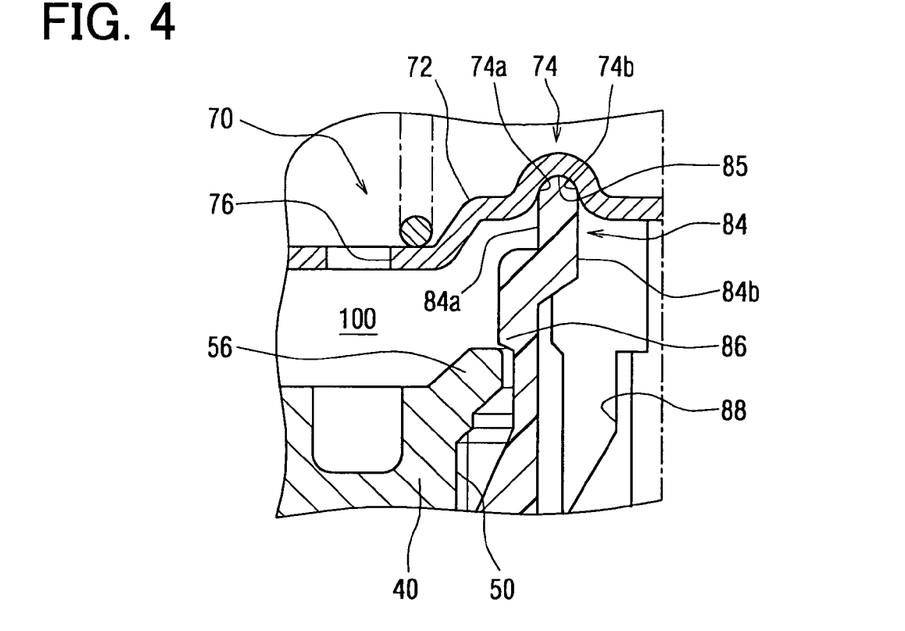
FIG. 4 is a cross-sectional side view showing a valve member and the drainpipe of the oil filter according to the first embodiment.

As shown in FIGS. 3 and 4, the valve member 70 has a circular recession 72 in its central portion. The circular recession 72 of the valve member 70 is circularly recessed to the upper side of the oil filter 10. The circular recession 72 has an annular recession 74 that receives the tip end of the drainpipe 80. The side face of the circular recession 72 is inclined, so that the circular recession 72 of the valve member 70 can tightly fit to the protrusion 56 of the cap 40 in a normal condition, so that oil received in the oil filter 10 is restricted from flowing out of the drain hole 50 in a normal condition. The circular recession 72 of the valve member 70 has a drain port 76 communicating with the inner space of the oil filter 10. When oil remaining in the inner space of the oil filter 10 is drained, the remaining oil is introduced into the drainpipe 80 through the drain port 76.

The annular recession 74 of the valve member 70 is a holding groove that can receive an upper end 84 of the drainpipe 80. Therefore, the annular recession 74 horizontally has an annular shape that has a substantially same diameter as the diameter of the upper end 84 of the drainpipe 80, so that the annular recession 74 can partially receive the upper end 84 of the drainpipe 80. The annular recession 74 has a substantially recessed arch shaped vertical cross-section that corresponds to the vertical cross-section of the upper end 84 of the drainpipe 80.

Referring back to FIG. 2, the drain hole 50 has a female thread 64 in its inner circumferential periphery, to which the drain bolt 60 is screwed in a normal condition. The drain bolt 60 is large enough to block the drain hole 50, and the drain bolt 60 has a flange 62 that fits to the bottom face of the cap 40. The flange 62 is larger in diameter than the cap side rib 42 formed on the bottom face of the cap 40. The upper face of the flange 62 can contact the O-ring 44 provided to the cap side rib 42, so that the inner space of the oil filter 10 is sealed against the outside of the oil filter 10. Thus, debris or the like can be restricted from flowing into the drain hole 50 in a normal condition.

Next, draining operation of remaining oil is described in detail. Referring back to FIGS. 3 and 4, the drainpipe 80 is a pipe member inserted into the drain hole 50 instead of the drain bolt 60 when oil remaining in the oil filter 10 is drained. The drainpipe 80 is made of an elastic material such as synthetic resin. The drainpipe 80 is constructed with a cylindrical pipe portion 82 and a flange 83. The flange 83 is formed in an intermediate portion of the pipe portion 82.

The pipe portion 82 has a hollow cylindrical shape. The pipe portion 82 is opened in its upper end and in its lower end. The pipe portion 82 has multiple slits 88 (only one slit is shown in FIG. 3) in a portion between the upper end 84 and the flange 83 to be drain passages. Oil remaining in the oil filter 10 flows from the slits 88 into an inner passage 90 of the pipe portion 82. The pipe portion 82 can be easily deformed resiliently by forming the slits 88, so that the pipe portion 82 can be easily inserted into the drain hole 50. The upper end 84 of the pipe portion 82 is converged to be small in diameter, so that the upper end 84 does not interfere with the sidewall of the circular recession 72 of the valve member 70 when the pipe portion 82 is inserted into the drain hole 50. When a tip end 85 of the drainpipe 80 contacts the valve member 70, the upper end 84 of the pipe portion 82 is partially received in the annular recession 74 of the valve member 70. The tip end 85 of the pipe portion 82 has a protruded substantially arch-shaped vertical cross section corresponding to the vertical cross section of the annular recession 74.

A hooking portion 86 is formed in an intermediate portion of the pipe portion 82, which is located between the tip end 85 and the flange 83. The hooking portion 86 of the pipe portion 82 can hook to the protrusion 56 formed in the cap 40. The hooking portion 86 is an outer circumferential sidewall partially radially protruded to the outside. The hooking portion (step portion) 86 hooks to the protrusion 56 of the cap 40, so that the drainpipe 80 can be maintained at a predetermined position. When the drain pipe 80 is inserted into the drain hole 50, and the hooking portion 86 of the pipe portion 82 hooks to the protrusion 56 of the cap 40, an upper face 83*a* of the flange 83 is located in the vicinity of the lower tip end of the cap side rib 42 of the cap 40. That is, the upper face 83*a* of the flange 83 is located on the slightly lower side with respect to the tip end, i.e., lower tip end 43*b* of the cap side rib 42, when the hooking portion 86 hooks to the protrusion 56 of the cap 40.

The flange 83 of the drainpipe 80 is a disc-shaped portion, i.e., disc-shaped collar, and the outer diameter of the flange 83 is larger than the outer diameter of the annular cap side rib 42 of the cap 40. A pipe side rib (annular rib) 92 is formed on the upper face 83*a* of the flange 83 to be a pipe side seal.

The outer diameter of the pipe side rib 92 is slightly larger than the inner diameter of the O-ring 44 provided into the cap side rib 42 of the cap 40. That is, when the drainpipe 80 is inserted into the drain hole 50, the outer circumferential sidewall of the pipe side rib 92 and the inner circumferential sidewall of the O-ring 44 compress with each other. In this situation, the inner space of the oil filter 10 is sealed against the outside. Therefore, oil flowing from the slits 88 into a gap between the drain hole 50 and the pipe portion 82 is restricted from flowing from a joint portion between the oil filter 10 and the drainpipe 80.

The pipe side seal is not limited to the pipe side rib 92, and the pipe side seal may be another member that is provided to the drainpipe 80 to form a sealing structure with a sealing member provided to the cap against the outside of the oil filter 10 and the drainpipe 80. When the upper face 83*a* of the flange 83 and the O-ring 44 compress with each other to form a sealing structure, the upper face 83*a* of the flange 83 becomes a pipe side seal, for example.

Figure 5:
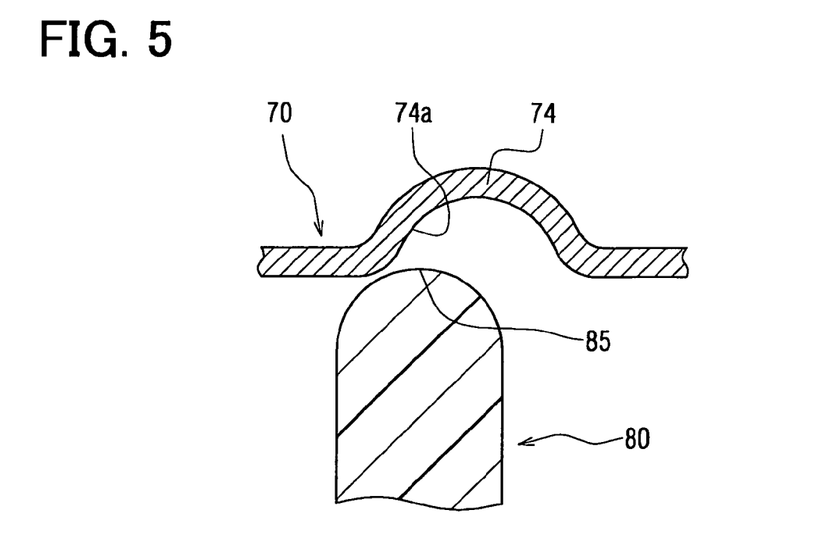
FIG. 5 is a cross-sectional side view showing a condition, in which the drainpipe is displaced in the oil filter according to the first embodiment.

Next, draining of remaining oil, replacement of the filter element and the O-ring is described in reference to FIGS. 4 and 5.

When the filter element is replaced, oil remaining in the oil filter 10 needs to be drained, in advance. When the remaining oil is drained from the oil filter 10, the drain bolt 60 is removed from the drain hole 50 of the cap 40. In this situation, the valve member 70 is urged by the resilient member 78 against the tip end 85 of the drainpipe 80 in its closing direction, in which the valve member 70 blocks the drain hole 50. Therefore, the drain hole 50 is blocked by the valve member 70, so that internal remaining oil does not flow out.

Subsequently, the drainpipe 80 is inserted into the drain hole 50. The drainpipe 80 is smaller than the drain hole 50 in diameter, so that the drainpipe 80 can be easily inserted into the drain hole 50. The drainpipe 80 resiliently deforms, so that the drainpipe 80 can be inserted into the small diameter portion 52 of the cap 40, which is substantially the same as the drainpipe 80 in diameter.

The drainpipe 80 is inserted into the drain hole 50, so that the tip end 85 of the drainpipe 80 contacts the valve member 70, and the tip end 85 of the drainpipe 80 raises the valve member 70 against resilience of the resilient member 78. The drainpipe 80 is inserted against resilience of the resilient member 78, so that the valve member 70 is displaced to the upper direction, and the drain hole 50 is unblocked, i.e., opened.

Thus, blockade by the valve member 70 is released, i.e., lifted, and a gap is formed between the bottom face of the valve member 70 and the internal top face in the cap 40. The gap is a drain passage 100. Remaining oil flows into the drain passage 100 from the drain port 76 formed in the valve member 70. The remaining oil flowing into the drain passage 100 flows into the inner passage 90 of the pipe portion 82 from the slits 88 of the drainpipe 80, and the remaining oil is drained to the outside of the oil filter 10 through the drainpipe 80. In this situation, the hooking portion 86 of the drainpipe 80 hooks to the protrusion 56 of the cap 40, so that the drainpipe 80 is maintained at a predetermined position.

Thus, the multiple slits 88 formed on the side face of the pipe portion 82 become drain ports of remaining oil. Accordingly, providing a member that blocks the slits 88 is not preferable, because the member blocking the slits 88 may reduce efficiency of draining. Accordingly, in this drain structure, any members are not provided to cover the side face of the drainpipe 80, excluding the protrusion 56 of the cap 40. Thus, efficiency of draining can be enhanced.

However, when only the protrusion 56 supports the drainpipe 80, gripping force of the drainpipe 80 is too small, and the drainpipe 80 may be inclined or detached by slight radial force. Especially, when remaining oil is at a high temperature, the drainpipe 80 is apt to be deformed, and the drainpipe 80 is easily detached or inclined. When the drainpipe 80 is inclined or detached, remaining oil leaks from a portion excluding the lower end, i.e., drain port of the drainpipe 80, and a problem such as burn of workers or dirt of clothes may arise. Besides, when the drainpipe 80 is readjusted every time the drainpipe 80 is inclined or detached, quick draining of remaining oil and quick replacement of a filter element are inhibited.

Therefore, the upper end 84 of the drainpipe 80 can be received in the annular recession 74 formed in the valve member 70. The annular recession 74 has sidewalls 74a, 74b that are holding walls supporting the upper end 84 of the drainpipe 80. That is, sidewalls 74a, 74b of the annular recession 74 supports an inner circumferential sidewall 84b and an outer circumferential sidewall 84a of the upper end 84 of the drainpipe 80. Thus, the drainpipe 80 is not apt to be inclined or detached even when radial force is applied to the drainpipe 80.

For example, the depth, i.e., vertical length of the annular recession 74 is set to be a distance e at about 7% of a press-insertion degree d, which is a distance between the flange 83 and the tip end 85 of the drainpipe 80. In this case, detach force, which is needed to detach the drainpipe 80 from the oil filter 10, increases by about 2 times to 2.5 times compared with a structure, in which the annular recession 74 is not formed in the valve member 70. That is, the recession 74 is formed in the valve member 70 to be a holding wall having a depth by about 7% of the press-insertion degree d between the flange 83 and the tip end 85, so that detach strength can be increased by about 2 times to 2.5 times.

The annular recession 74, i.e., the holding wall is a wall supporting the upper end 84 of the drainpipe, so that the annular recession 74 does not obstruct the slits 88, i.e., drain ports. Therefore, forming of the annular recession 74 does not reduce efficiency of draining. Besides, the annular recession 74 protrudes into the internal space side of the fluid filter 10, so that the press-insertion degree d of the drainpipe 80 can be increased. Therefore, the drain passage 100, i.e., the gap between the bottom face of the valve member 70 and the internal top face of the cap 40 is expanded. Totally, efficiency draining oil can be enhanced.

Furthermore, the cross-section of the annular recession 74 of the valve member 70 is formed to be a recessed arch shape corresponding to the cross-section of the tip end 85 of the drainpipe 80 in the vertical direction in FIG. 4, so that the drainpipe 80 can be easily positioned. The drainpipe 80 may be inserted into to the oil filter 10 in an inclined manner, i.e. while the drainpipe 80 is inclined with respect to the oil filter 10. In this case, as shown in FIG. 5, the tip end 85 of the drainpipe 80 contacts a place distant from the annular recession 74. However, even the drainpipe is inserted into a distant place, the tip end 85 of the drainpipe 80 slips along the inclined sidewall 74a of the annular recession 74 by further inserting the drainpipe 80, so that the tip end 85 can be adjusted at an appropriate position. That is, the cross-section of the tip end 85 of the drainpipe 80 and the cross-section of the annular recession 74 of the valve member 70 is formed in an arch-shape, so that the drainpipe 80 can be easily positioned. The tip end 85 of the drainpipe 80 and the annular recession 74 of the valve member 70 is not limited to an arch shape. The tip end 85 and the annular recession 74 can have another inclined face.

Thus, gripping force of the drainpipe 80 can be enhanced without decreasing draining performance of remaining oil.

(Second Embodiment)

Figure 6:
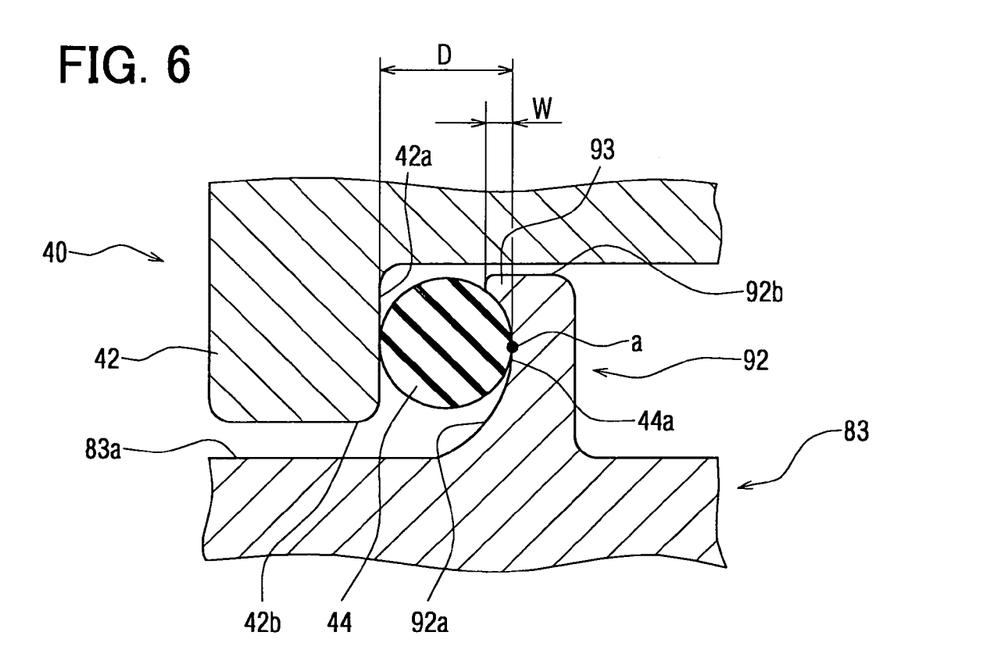
FIG. 6 is a cross-sectional side view showing a curling portion of the drainpipe holding a seal member according to a second embodiment of the present invention.

As shown in FIG. 6, the O-ring 44, i.e., elastic seal member is provided to an annular wall 42a that is the inner circumferential sidewall of the cap side rib 42. The O-ring 44 is maintained radially inside of the annular wall 42a of the cap side rib 42 by elastic restoring force of the O-ring 44, so that the O-ring 44 does not easily drop from the annular wall 42a of the cap side rib 42.

A pipe side wall 92a, which is the sidewall of the pipe side rib 92 formed on the flange 83, radially outwardly compresses the O-ring 44 provided to the annular wall 42a of the cap side rib 42 of the cap 40. Therefore, the connecting portion between the cap 40 and the flange 83 are sealed with the O-ring 44 against the outside of the cap 40 and the flange 83. Thus, remaining oil is restricted from leaking to the outside of the connecting portion between the cap 40 and the flange 83.

The pipe side rib 92 is formed in a position, in which a pipe side wall 92a can radially compress the O-ring 44. The pipe side wall 92a is the outer circumferential side face of the pipe side rib 92. That is, the cap side rib 42 is formed along with the radially inside face of the O-ring 44. when the drainpipe 80 is inserted into the drain hole 50 of the cap 40 and the pipe side wall 92a engages with the annular O-ring 44, the pipe side wall 92a is located along with a radially inner side face of the annular O-ring 44. The pipe side wall 92a is slightly curved to the radially outside to the O-ring 44 side. A curling portion 93 is formed on the tip end 92b of the pipe side wall 92a. The curling portion 93 is located on the radially outside with respect to a most radially internal portion of the O-ring 44. That is, the curling portion 93 digs into the O-ring 44 from radially inside of the O-ring 44 when the curling portion 93 engages with the O-ring 44. The digging degree W is preferably about 5% to 30% with respect to the O-ring thickness D. Obviously, the digging degree can be set at another degree in consideration of elasticity of the O-ring 44 and a material of components.

The pipe side wall 92a compresses the O-ring 44 to seal the connecting portion between the cap 40 and the flange 83 against the outside of the connecting portion. That is, the pipe side wall 92a can seal the connecting portion with O-ring. In this structure, remaining oil leaking from the slits 88, i.e., drain passage to the inside of the gap between the cap 40 and the pipe portion 82, is restricted from flowing to the outside of the connecting portion between the cap 40 and the flange 83. The pipe side wall 92a of the drainpipe 80 is a removing means that removes the O-ring 44 while the pipe side wall 92a holds at least a part of the O-ring 44, when the drainpipe 80 is detached from the drain hole 50.

When the remaining oil is entirely drained, the drainpipe 80 is detached from the drain hole 50.

Figure 7A:
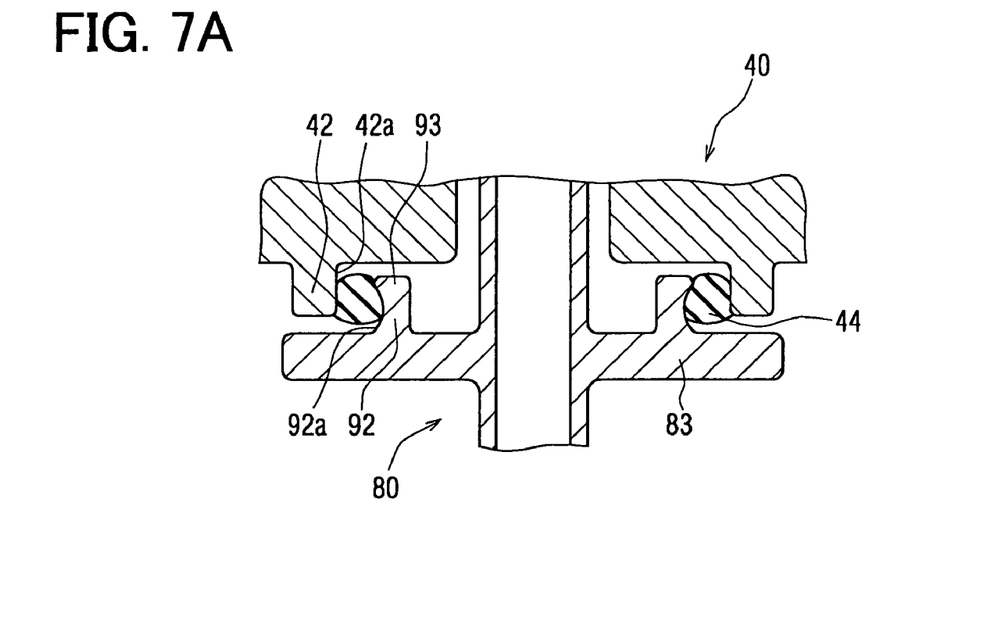
FIGS. 7A and 7B are cross-sectional side views showing physical relationships between the cap and the drainpipe according to the second embodiment.

As shown in FIG. 7A, when the drainpipe 80 is inserted into the drain hole 50, the pipe side wall 92a, which is the radially outer sidewall of the pipe side rib 92 of the flange 83, compresses the O-ring 44, so that the connecting portion between the cap 40 and the flange 83 is sealed against the outside. That is, when the drainpipe 80 is inserted into the drain hole 50 and the pipe side wall 92a of the drainpipe 80 engages with the annular O-ring 44, the pipe side wall 92a press substantially entirely the inner circumferential periphery 44a of the annular O-ring 44. The pipe side wall 92a seals with the annular O-ring 44 therebetween against the outside.

Figure 7B:
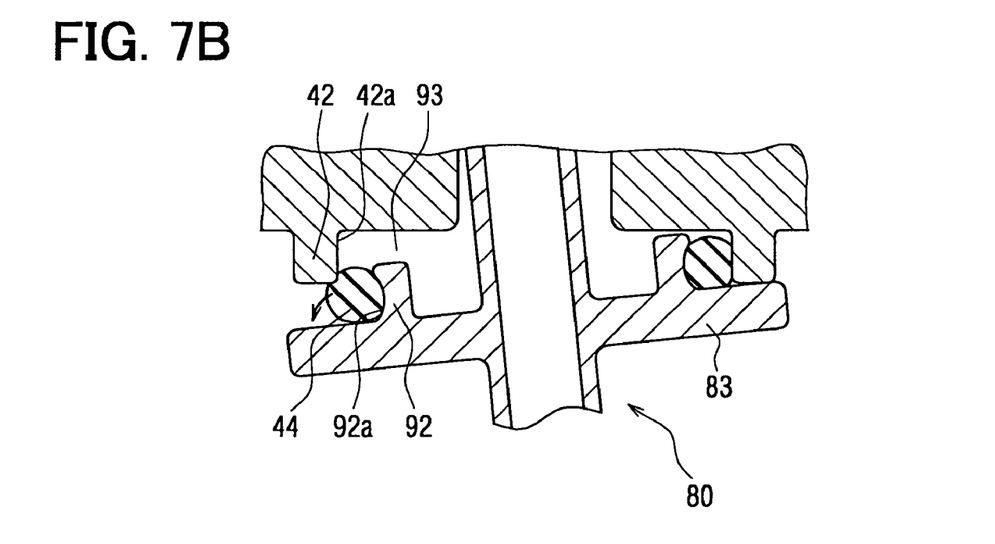

When draining of remaining oil is finished, the drainpipe 80 is detached from the cap 40 of the oil filter 10. Specifically, radial force is applied to resiliently deform the drainpipe 80 when the drainpipe 80 is detached, so that the outer diameter of the drainpipe 80 is changed. In this situation as shown in FIG. 7B, the drainpipe 80 is inclined by the radial force. When the drainpipe 80 is inclined, the flange 83 and the pipe side rib 92 are also inclined with respect to the cap 40. That is, a portion of the pipe side rib 92 (right side in FIG. 7B) upwardly moves radially inwardly of the drainpipe 80 in a direction, in which the portion of the pipe side rib 92 departs from the O-ring 44. That is, the portion of the pipe side rib 92 is displaced radially inwardly from the cap side rib 42 of the cap 40 while releasing radial compression of the O-ring 44. On the other hand, the other portion of the pipe side rib 92 (left side in FIG. 7B) downwardly moves radially outwardly in a direction, in which the other portion of the pipe side rib 92 approaches the O-ring 44. That is, the other portion of the pipe side rib 92 radially outwardly compresses the O-ring 44 against the cap side rib 42 of the cap 40.

Therefore, the pipe side wall 92a of the flange 83 moves to the lower side in a direction, in which the O-ring 44 is removed from the cap 40, while radially outwardly compressing the O-ring 44 against the cap side rib 42 of the cap 40. By this compression of the O-ring 44, a part of the pipe side wall 92a of the flange 83 can partially hold the O-ring 44, so that the pipe side wall 92a scrapes the O-ring 44 out of the cap side rib 42 of the cap 40. That is, the curling portion 93 of the pipe side wall 92a hooks to the O-ring 44, and the pipe side wall 92a picks the O-ring 44 out of the cap side rib 42. Thus, the O-ring 44 is partially removed from the cap side rib 42. Furthermore, the drainpipe 80 is pulled out, or radial force is applied to the drainpipe 80, so that the O-ring 44 is entirely removed from the cap side rib 42.

That is, the drainpipe 80 is detached from the cap 40, and the O-ring 44 can be simultaneously removed from the cap 40 of the oil filter 10. By contrast, conventionally removal operation of the O-ring 44 is an individual work performed additionally to detaching the drainpipe 80. However, as described in this embodiment, the pipe side wall 92a is formed on the flange 83 of the drainpipe 80, so that the drainpipe 80 removes the O-ring 44 from the cap 40 while holding the O-ring 44. Thus, detaching the drainpipe 80 and removal of the O-ring 44 can be simultaneously performed. Therefore, entire work time for replacing components of the oil filter 10 can be reduced. Besides, conventionally, a thin bar-shaped tool is used to hook the O-ring 44 to remove the O-ring 44. However, the removing means of the O-ring 44 is provided to the drainpipe 80, so that the O-ring 44 can be easily removed from the oil filter 10 without using additional tools.

The curling portion 93 is formed on the pipe side wall 92a to hook the O-ring 44, so that the scraped, i.e., removed O-ring 44 from the cap 40 is maintained on the pipe side rib 92, and the O-ring 44 is not pulled out of the pipe side rib 92 of the flange 83. Therefore, the O-ring 44 is restricted from popping out of the drainpipe 80 due to elastic force of the O-ring 44, when the drainpipe 80 is detached. Thus, clothes can be restricted form getting dirt due to splash of oil adhering to the O-ring 44, and the O-ring 44 can be restricted from being lost. That is, splash of oil and loss of the removed O-ring 44 can be restricted by forming the curling portion 93 on the pipe side wall 92a of the drainpipe 80. After detaching the drainpipe 80 and the O-ring 44 from the oil filter 10, the cap 40 is removed from the case 16 of the oil filter 10 and the filter element 14 received in the main body 12 of the oil filter 10 is replaced into new one.

Obviously, the removing means, such as the pipe side wall 92a and the curling portion 93 are formed on the flange 83 of the drainpipe 80, so that the O-ring 44 can be removed by detaching the drainpipe 80, which is a necessary work for replacing the filter element 14. Thus, a process needed for replacing the filter element 14 is simplified, so that entire work time for replacing components of the oil filter 10 can be reduced.

(Other Embodiment)

In the above embodiment, the annular recession 74 protruded into the inside of the oil filter 10 is formed, however, other shape can be used when it has a holding wall that supports the tip end 85 of the drainpipe 80.

Figure 8A:
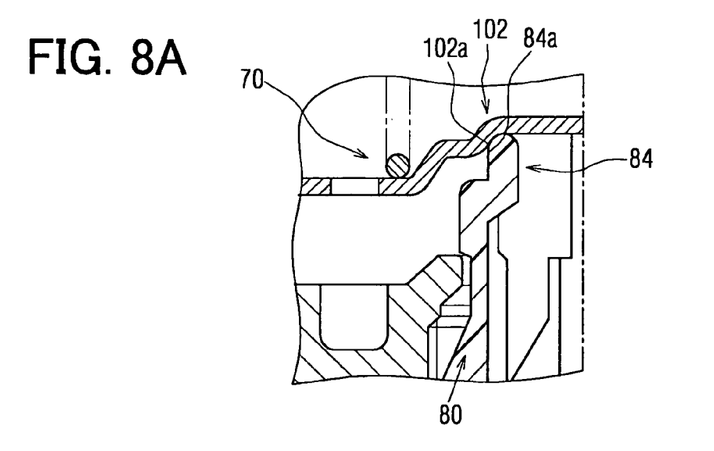
FIGS. 8A to 8C are cross-sectional side views showing examples of the valve member according to an embodiment of the present invention.

As shown in FIG. 8A, a recession, which has only an outer holding wall to hold the outer circumferential sidewall 84a of the drainpipe 80, can be formed, for example. This can be formed with a circular recession 102 formed in the valve member 70. The diameter of the circular recession 102 is substantially same as the outer diameter of the upper end 84 of the drainpipe 80. A sidewall 102a of the circular recession 102 becomes an outer holding wall that supports the outer circumferential sidewall 84a of the upper end 84. Gripping force of the drainpipe 80 can be sufficiently enhanced by only the outer circumferential sidewall.

Figure 8B:
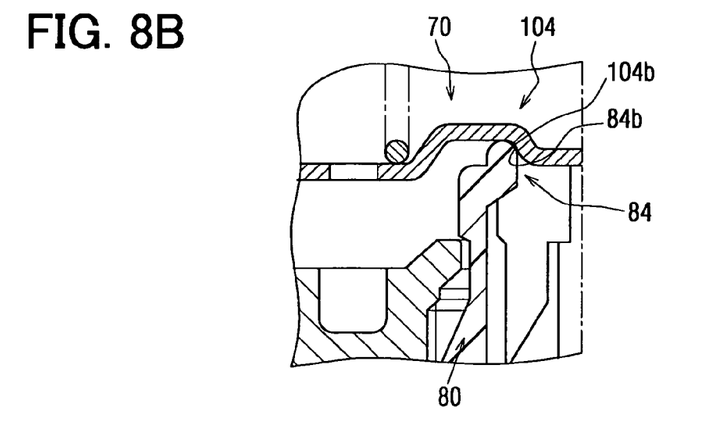

As shown in FIG. 8B, a recession, which has only an inner holding wall to hold the inner circumferential sidewall 84b of the drainpipe 80, can be formed. This can be formed with a circular recession 104 formed in the valve member 70. The diameter of the circular recession 104 is substantially same as the inner diameter of the upper end 84 of the drainpipe 80. A sidewall 104b of the circular recession 104 becomes an inner holding wall that supports the inner circumferential sidewall 84b of the upper end 84. Gripping force of the drainpipe 80 can be sufficiently enhanced by only the inside wall.

Figure 8C:
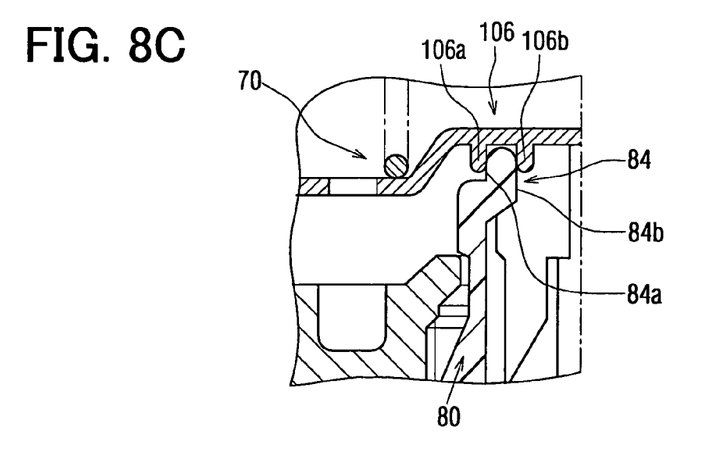

Further, as shown in FIG. 8C, a rib or the like protruded to the outside can be used, not a recession protruded to the inside of the oil filter.

This can be formed with double circular ribs 106 on the valve member 70. The diameter of the ribs 106 is substantially same as the outer diameter and the inner diameter of the upper end 84 of the drainpipe 80. The double circular ribs 106 respectively become an inner holding wall 106b and an outer holding wall 106a to respectively support the inner circumferential sidewall 84b and the outer circumferential sidewall 84a of the upper end 84 of the drainpipe 80. Thus, gripping force of the drainpipe 80 can be enhanced.

Other shape can be used when a structure has a holding wall to support an upper end portion of a drainpipe 80, even it is other than the above examples. In the above examples, a round pipe is used as the drainpipe 80. However, a square pipe can be used, for example. In this embodiment, an oil filter is used as an example of a fluid filter. However, a filter, which is used to filter and clean other fluid, can be used.

In this embodiment, the curling portion 93 is formed on the pipe side wall 92a, however, the curling portion 93 is not necessary. That is, the pipe side wall 92a can be a flat wall. The pipe side wall 92a is formed along with an entire inner circumferential periphery 44a of the O-ring 44, however, the pipe side wall 92a can be a wall partially formed inside of the O-ring 44. In this embodiment, the wall is used as the removing means, however, the removing means is not limited to the wall. Other structures can be used, such that at least a part of the seal member provided to the cap is held so that the seal member is removed from the cap when a drainpipe 80 is detached from a drain hole.

Various modifications and alternations may be made to the above embodiments without departing from the spirit of the present invention.

What is claimed is:

1. A drain structure of a fluid filter, the drain structure comprising:
   a main body;
   a cap that is detachable from the main body, the cap defining a drain hole that communicates with an inside of the main body;
   a drainpipe that is detachable from the drain hole and is able to be inserted into the drain hole;
   a valve member that blocks the drain hole at least when the drainpipe is detached from the drain hole;
   a cap side rib that is provided to the cap;
   a pipe side rib that is provided to the drainpipe to seal with the cap side rib against an outside; and
   a holding wall that is provided to the valve member,
   wherein the drainpipe is inserted into the drain hole so that an upper end of the drainpipe contacts the valve member to displace the valve member in a direction in which the drain hole is unblocked,
   fluid inside of the main body flows into the drainpipe through a drain passage defined in a portion of the drainpipe between the pipe side rib and an upper end of the drainpipe by insertion of the drainpipe,
   the holding wall supports the upper end of the drainpipe that is inserted into the drain hole,
   the drainpipe has a hooking portion that protrudes outwardly in a radial direction of the drainpipe,
   the cap has a protrusion that protrudes inwardly in a radial direction of the cap,
   the hooking portion of the drainpipe engages the protrusion of the cap when the drainpipe is inserted into the drain hole, and
   the holding wall makes contact with at least an inner circumferential periphery of the drainpipe when the drainpipe is inserted into the drain hole.

2. A drain structure of the fluid filter according to claim 1, wherein the holding wall has an outer holding wall that supports a radially outer circumferential sidewall of the upper end of the drainpipe.

3. A drain structure of the fluid filter according to claim 1, wherein the holding wall has an inner holding wall that supports a radially inner circumferential sidewall of the upper end of the drainpipe.

4. A drain structure of the fluid filter according to claim 1, wherein the holding wall is a holding groove having a sidewall formed in the valve member to receive the upper end of the drainpipe.

5. A drain structure of the fluid filter according to claim 4, wherein the holding groove has a recessed arch shaped vertical cross section corresponding to a protruded arch shaped vertical cross section of the upper end of the drainpipe.

6. A fluid filter comprising the drain structure according to claim 1.

7. A fluid filter comprising a drain structure including:
   a main body;
   a cap that is detachable from the main body, the cap defining a drain hole that communicates with an inside of the main body;
   a drainpipe that is detachable from the drain hole and is able to be inserted into the drain hole;
   a valve member that blocks the drain hole at least when the drainpipe is detached from the drain hole;
   a cap side rib that is provided to the cap;
   a pipe side rib that is provided to the drainpipe to seal with the cap side rib against an outside; and
   a holding wall that is provided to the valve member,
   wherein the drainpipe is inserted into the drain hole so that an upper end of the drainpipe contacts the valve member to displace the valve member in a direction in which the drain hole is unblocked,
   the holding wall supports the upper end of the drainpipe that is inserted into the drain hole,
   the drainpipe has a hooking portion that protrudes outwardly in a radial direction of the drainpipe.
   the can has a protrusion that protrudes inwardly in a radial direction of the cap,
   the hooking portion of the drainpipe engages the protrusion of the cap when the drainpipe is inserted into the drain hole, and
   the holding wall makes contact with at least an inner circumferential periphery of the drainpipe when the drainpipe is inserted into the drain hole.

8. A drain structure of the fluid filter according to claim 1, further comprising:
   a seal member that is provided to the cap to seal between the cap and the drainpipe,
   wherein the drainpipe has a removing means that at least partially holds the seal member to remove the seal member from the cap when the drainpipe is detached from the drain hole.

9. A drainpipe unit of a fluid filter, the drainpipe unit comprising:
a cap that defines a drain hole;
a drainpipe that is detachable from the drain hole and is able to be inserted into the drain hole;
a seal member that is provided to the cap to seal between the cap and the drainpipe; and
a removing means that is provided to the drainpipe to at least partially hold the seal member to remove the seal member from the cap when the drainpipe is detached from the drain hole.

10. A drainpipe unit according to claim 9, further comprising:
a valve member that blocks a drain hole at least when the drainpipe is detached from the drain hole,
wherein the drainpipe is inserted into the drain hole so that the drainpipe contacts the valve member to displace the valve member in a direction in which the drain hole is unblocked in order to introduce fluid to an outside through the drainpipe.

11. A drainpipe unit according to claim 9,
wherein the seal member has an annular shape,
the seal member is provided to an annular wall of a circumferential wall formed in a bottom face of the cap that opposes to the drainpipe,
the removing means is a pipe side wall, and
when the drainpipe is inserted into the drain hole and the pipe side wall engages with the annular seal member, the pipe side wall is located along with a radially inner side face of the annular seal member.

12. A drainpipe unit according to claim 11, wherein the pipe side wall has a tip end including a curling portion that hooks to the seal member.

13. A drainpipe unit according to claim 11,
wherein when the drainpipe is inserted into the drain hole and the pipe side wall engages with the annular seal member, the pipe side wall is able to press a substantially entire inner circumferential periphery of the annular seal member, and
the pipe side wall is able to seal with the annular seal member therebetween against the outside.

14. A drainpipe unit according to claim 11 further comprising:
a flange that has an upper face opposing to the cap,
wherein the upper face of the flange is located at an opposite side as the valve member with respect to a tip end of the annular wall of the cap when the drainpipe is inserted into the drain hole, and
the pipe side wall is a sidewall of an annular pipe side rib formed on the upper face of the flange.

15. A fluid filter comprising:
a main body;
a cap that is detachable from the main body, the cap defining a drain hole that communicates with an inside of the main body;
a drainpipe that is detachable from the drain hole and is able to be inserted into the drain hole;
a valve member that blocks the drain hole at least when the drainpipe is detached from the drain hole;
a substantially annular seal member that is provided to the cap to seal between the cap and the drainpipe; and
a removing means provided to the drainpipe,
wherein the drainpipe is inserted into the drain hole so that the drainpipe contacts the valve member to displace the valve member in a direction in which the drain hole is unblocked, and
the removing means at least partially holds the seal member to remove the seal member from the cap when the drainpipe is detached from the drain hole.

16. A drainpipe unit according to claim 9 further comprising:
a valve member that blocks the drain hole at least when the drainpipe is detached from the drain hole;
a cap side rib that is provided to the cap;
a pipe side rib that is provided to the drainpipe to seal with the cap side rib against an outside; and
a holding wall that is provided to the valve member,
wherein the drainpipe is inserted into the drain hole so that an upper end of the drainpipe contacts the valve member to displace the valve member in a direction in which the drain hole is unblocked, and
the holding wall supports the upper end of the drainpipe that is inserted into the drain hole.

17. A drain structure of a fluid filter, the drain structure comprising:
a main body;
a cap that is detachable from the main body, the cap defining a drain hole that communicates with an inside of the main body;
a drainpipe that is detachable from the drain hole and is able to be inserted into the drain hole;
a valve member that blocks the drain hole at least when the drainpipe is detached from the drain hole;
a cap side rib that is provided to the cap;
a pipe side rib that is provided to the drainpipe to seal with the cap side rib against an outside; and
a holding wall that is provided to the valve member,
wherein the drainpipe is inserted into the drain hole so that an upper end of the drainpipe contacts the valve member to displace the valve member in a direction in which the drain hole is unblocked,
fluid inside of the main body flows into the drainpipe through a drain passage defined in a portion of the drainpipe between the pipe side rib and an upper end of the drainpipe by insertion of the drainpipe, and
the holding wall supports the upper end of the drainpipe that is inserted into the drain hole; and further comprising:
a seal member that is provided to the cap to seal between the cap and the drainpipe,
wherein the drainpipe has a removing means that at least partially holds the seal member to remove the seal member from the cap when the drainpipe is detached from the drain hole.

18. A drain structure of the fluid filter according to claim 1, wherein an outer radius of the hooking portion is greater than an inner radius of the protrusion with respect to a center of the drainpipe and drain hole, respectively.

19. A drain structure of the fluid filter according to claim 7, wherein an outer radius of the hooking portion is greater than an inner radius of the protrusion with respect to a center of the drainpipe and drain hole, respectively.

* * * * *